April 22, 1952 — P. N. HILLESHEIM — 2,594,018
PARACHUTE CONNECTOR LINK
Filed July 12, 1950 — 2 SHEETS—SHEET 1

INVENTOR
PHILIP N. HILLESHEIM
BY Bailey, Stephens & Huettig
ATTORNEYS

April 22, 1952 P. N. HILLESHEIM 2,594,018
PARACHUTE CONNECTOR LINK
Filed July 12, 1950 2 SHEETS—SHEET 2

INVENTOR
PHILIP N. HILLESHEIM
BY Bailey, Stephens & Huettig
ATTORNEYS

Patented Apr. 22, 1952

2,594,018

UNITED STATES PATENT OFFICE 2,594,018

PARACHUTE CONNECTOR LINK

Philip Nelson Hillesheim, St. Thomas, Ontario, Canada

Application July 12, 1950, Serial No. 173,420

4 Claims. (Cl. 244—151)

This invention relates to parachutes and parachute harnesses and in particular to a connector link for connecting the straps of the harness webbing to the shroud lines of the canopy of a parachute.

Such connector links have in the past been D-shaped, with the shroud lines of the canopy looped over the round part of the D and knotted upon themselves and with the strap of the harness webbing looped over the straight part of the D and sewn upon itself.

This arrangement has suffered from serious disadvantages in that it has been impossible to replace a damaged canopy without returning the parachute harness to the factory because of the permanent way in which the shroud lines and the harness webbing are attached to the link. The knotting of the shroud lines on themselves is a factory job and with the D-shaped ring at present in use it is impossible to detach a damaged canopy without cutting the knotted lines and it is impossible to attach a new canopy in its looped and knotted state. Similarly the webbing strap which has been looped and sewn must have its sewing cut in order that the webbing may be removed, and the strap of the new harness must then be sewn on.

It is an object of this invention to provide a link which allows a new canopy to be quickly substituted for a damaged canopy.

It is an object of this invention to provide a link which allows a new harness to be substituted for a damaged harness without damaging the harness or the parachute straps.

It is an object of this invention to supply a means by which any canopy may be attached to any harness without disturbing the harness or the canopy.

This invention proposes to facilitate the replacing of the canopy by supplying a connector link having either one or more spools over which the shroud lines may be looped and knotted in the factory, and a body to which the spool or spools may be attached or detached at will. Thus when a canopy becomes damaged, it is merely necessary to remove the damaged canopy by detaching from the body, the spools to which it is attached, and to attach a new canopy by attaching to the body the spools to which it is attached. There is no need to return the parachute or the canopy to the factory in order to do this as it may be done in the field. Similarly, means are provided in this invention to allow webbing straps to be detached and attached without cutting the sewing of the loops.

This connector link in one embodiment, suitable for the seat-type or back-type parachute comprises a body, a spool over which a number of shroud lines (usually a quarter of the total number of lines) may be looped, a sleeve over which a strap from the parachute harness may be looped, means for attaching said spool and said sleeve to said body, so that they will stay attached through the impact of the opening of the canopy but in such a way that the spool or the sleeve may be easily detached or attached on the ground.

Another embodiment of the invention, especially designed to suit the chest pack, comprises a body and a number (usually a pair) of spools over each of which, a number of shroud lines (usually a quarter of the total number of lines) may be looped, means to secure the body to one of the clips of the chest-pack type of webbing, means for securing the body to the parachute container, and means for attaching said spools to said body so that they will stay attached through the impact of opening of the canopy but in such a way that the spools may be easily detached or attached on the ground.

Each spool and sleeve is bored axially to receive a bolt, and for each spool and sleeve which is to be attached thereto, the body is provided with a pair of aligned eyes, between which the spool or sleeve may be received and bolted in place.

By making the spools and the body attaching means identical for both embodiments of the invention it is not only possible to replace damaged canopies in both the seat-type and chest-type parachutes but it is possible to interchange a canopy between the seat-type and chest-type parachute without returning the parachutes or canopies to the factory.

Using this invention therefore it is unnecessary to return a parachute to the factory in order to replace a damaged canopy and the replacement of a damaged harness is facilitated.

This invention and its use will be realized by referring to the attached drawings in which.

Figure 1:
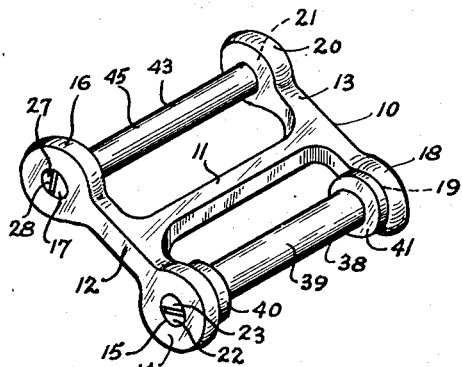
Figure 1 shows a perspective view of the connector link.
Figure 2:
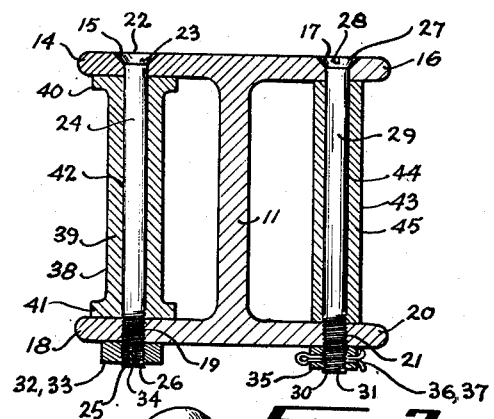
Figure 2 shows a horizontal cross section taken half way through the link.
Figure 3:
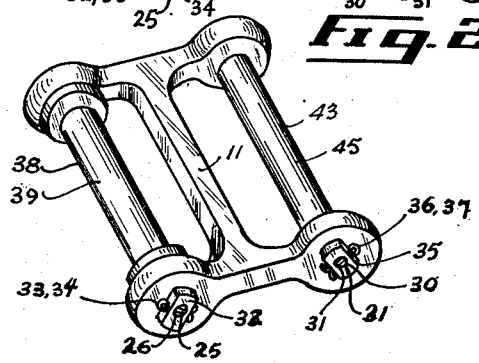
Figure 3 shows a perspective view of the link from a different angle to that of Figure 1.
Figure 6:
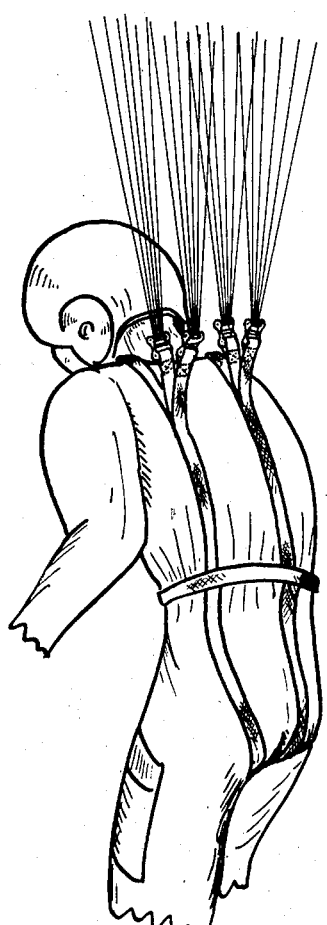
Figure 6 shows the application of four of the links in connecting the shroud lines to the webbing.
Figure 4:
Figure 4 shows a perspective view of a sleeve.
Figure 5:
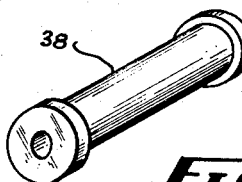
Figure 5 shows a perspective view of a spool.
Figure 7:
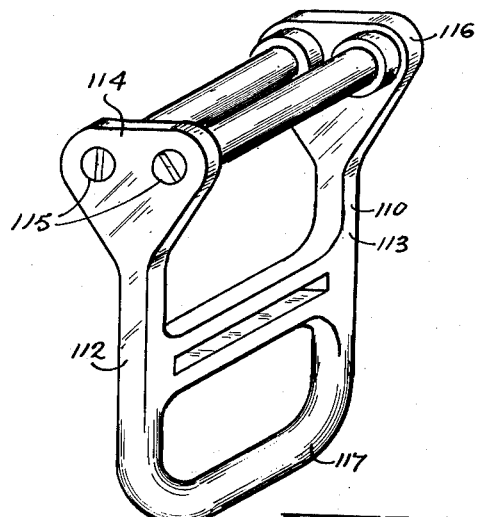
Figure 7 shows a perspective view of an alternate design of the connector link.

This invention in its preferred form for use with a pack such as a seat-type or back-type pack has an H-shaped body 10 with a cross bar 11 and uprights 12 and 13. The upright 12 terminates at its upper end in a boss 14 which has an eye 15 countersunk on the outside of the upright, and at its lower end in a boss 16 which has an eye countersunk on the outside of the upright 17. The upright 13 terminates at its upper end in a boss 18 which has a threaded eye 19, which eye is aligned with eye 15, and at its lower end in a boss 20 which has a threaded eye 21, which eye is aligned with eye 17. A bolt 22 has a countersunk head 23 which is notched to receive a screwdriver, a smooth shank 24, and end 25, having threading 26 and being notched to receive a cotter pin. A bolt 27 has a countersunk head 28 which is notched to receive a screwdriver, a smooth shank 29, and an opposite end 30 having threading 31 and being notched to receive a cotter pin. The countersinking of the eye 15 corresponds to the shape of the countersunk head 23, while the threading of the threaded eye 19 is complementary to the threading 26. The bolt 22 is of sufficient length that when the head 23 is seated in the eye 15, the threading 26 projects through the eye 19 just far enough to receive a nut. The countersinking of the eye 17 corresponds to the shape of the countersunk head 28, while the threading of the threaded eye 21 is complementary to the threading 31. The bolt 27 is of sufficient length that when the head 28 is seated in the eye 17, the threading 31 projects through the eye 21 just far enough to receive a nut. A nut 32 is provided, threaded to screw onto the projecting threading 26, and having holes 33 drilled therethrough radially of the threading to receive a cotter pin 34 which goes through the holes and lies in the notch in the end 25. A nut 35 is provided, threaded to screw onto the projecting threading 31 and having holes 36 drilled therethrough, radially of the threading to receive a cotter pin 37 which goes through the holes and lies in the notch in the end 30. A spool 38 has a smooth cylindrical shank 39, circular retaining rims 40 and 41 and a smooth bore 42, concentric with the rims and shank, therein. The bore is of sufficient diameter to fit loosely on the smooth shank 24 of the bolt 22 while the distance between the outside walls of the rims 40 and 41 is just sufficiently less than the distance between the inside walls of the bosses 14 and 18 as to fit loosely between them. A hollow cylindrical sleeve 43 has a smooth bore 44 and a smooth exterior 45 which are concentric. The bore 44 is of sufficient diameter to receive the smooth shank 29 of the bolt 27 and the length of the sleeve 43 is just sufficiently less than the distance between the inside walls of the bosses 16 and 20 as to fit easily between them.

The use of the device whose parts are above described, is as follows: Four connector links are usually used in connecting the harness webbing to the shroud lines. To each of these is attached one of four straps from the webbing, and one quarter of the shroud lines from the canopy. It is therefore proposed to discuss the connector link in which this invention lies, it being understood that four of these links will be used, and that each will replace one of the links now in use. The canopy will be packed as before but the shroud lines will be looped and knotted over four spools 38 (one quarter of them over each) lying around the shank 39 and retained thereon by the rims 40 and 41. Each spool 38 is attached to a body 10 by placing it between bosses 14 and 18 and threading bolt 22 through eye 15, and bore 42 and screwing it into threaded eye 19 until the head 23 is seated in the countersunk eye 15. The threading 26 now projects sufficiently beyond eye 19 to allow a nut 32 to be screwed thereon. The nut is screwed onto the threading until it jambs against the outer wall of the boss 18, exerting a lock-nut effect. At the same time, a cotter pin 34 is threaded through the holes 33, and through the notching in the end 26, preventing rotation of the nut in case the lock-nut effect fails. The shroud lines are now firmly attached to the body. Each strap of the webbing which is looped and sewn will have a sleeve 43 threaded into the loop. Each sleeve is attached to the other end of the body 10 by placing it between bosses 16 and 20 and threading bolt 27 through eye 17 and bore 44 and screwing it into threaded eye 21 until the head 28 is seated in the countersunk eye 17. The threading 31 now projects sufficiently beyond eye 21 to allow a nut 35 to be screwed thereon. The nut is screwed onto the threading until it jambs against the outer wall of the boss 20 exerting a lock-nut effect. At the same time, a cotter pin 37 is threaded through the holes 36 and through the notching in the end 30, preventing rotation of the nut, in case the lock-nut effect fails. The webbing strap is now firmly attached to the body and through it to the shroud lines. When the above described process is repeated four times the webbing is firmly attached to the canopy. In order to replace a canopy it is merely necessary to remove each of the four spools which have the shroud lines of the damaged canopy, by removing the cotter pin 34, unscrewing the nut 32, and withdrawing the bolt 22, and then attaching the spools to which are attached the shroud lines of the new canopy, as described above. It is similarly possible to change the webbing by disengaging the sleeves from the body, threading them out of the loops in the straps of the webbing to be replaced and threading them into the loops of the straps of the new webbing, then attaching the sleeves to the body in the manner heretofore described.

For use with chest packs there is now shown an alternate embodiment of the invention which comprises a U-shaped body 110 with a base 117, uprights 112 and 113 and double-bosses 114 and 116 at the upper extremity of the uprights 112 and 113 respectively. Situated between the base 117 and the double-bosses 114 and 116 and joining the two uprights is a cross-bar 111 which has a longitudinal slot 118 cut therein. Double-boss 114 has twin eyes 115 cut therein each eye being countersunk on the outside of the double-boss 114 and being similar to and preferably identical with, the eye 15 described in the main embodiment of the invention. Double-boss 116 has twin threaded eyes 119 cut therein, each eye being similar to and preferably identical with the eye 19 described in the main embodiment of the invention. The line joining the centres of twin eyes 115 is roughly perpendicular to the longitudinal direction of the upright 112 while the line joining the centres of twin eyes 119 is roughly perpendicular to the longitudinal direction of the upright 113. Furthermore each of the twin eyes 115 is aligned with one of the twin eyes 119. Twin bolts 122 each have a countersunk head 123 which is notched to receive a screwdriver, a smooth shank 124, and end 125 having threading 126 and being notched to receive a cotter pin. Each bolt 122 is similar to and preferably identical with the bolt 22 of the main embodiment of the invention. The countersinking of the eye 115 corresponds to the shape of the countersunk head 123, while the threading of the threaded eye 119 is complementary to the threading 126. Since the distance between each eye 115 and its corresponding eye 119 is approximately, and preferably precisely, the same as the distance between eye 15 and eye 19 in the main embodiment of the invention, the bolt 122 is of just sufficient length, that when the head 123 is seated in the eye 115 the threading 126 projects through the eye 119 just far enough to receive a nut. Twin nuts 132 are provided, threaded to screw onto the projecting threading 126 of a bolt 122, and having holes 133 drilled therethrough, radially of the threading to receive a cotter pin 134 which goes through the holes and lies in the notch in the end 125. Each nut 132 is similar to and preferably identical with the nut 32 of the main embodiment of the invention.

Twin spools 138, are each similar to, and preferably identical with, spool 38 of the main embodiment of the invention, each having a smooth cylindrical shank 139, circular retaining rims 140 and 141 and a smooth bore 142, concentric with the rims and shank, therein. The bore is of sufficient diameter to fit loosely on the smooth shank 124 of the bolt 122 while the distance between the outside walls of the rims 140 and 141 is just sufficiently less then the distance between the inside walls of the bosses 114 and 118 as to fit loosely between them.

Figure 8:
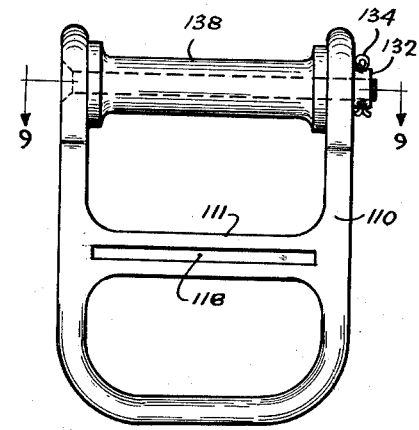
Figure 8 shows a plan view of the alternate design.
Figure 9:
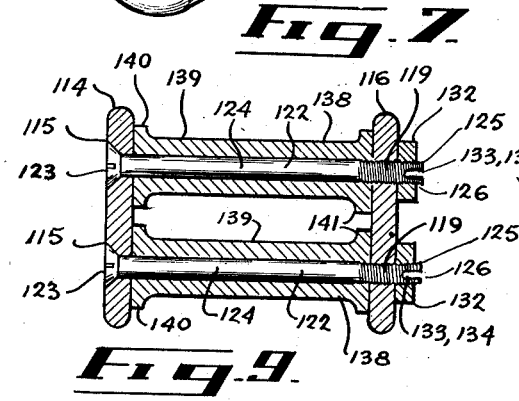
Figure 9 shows a cross section taken along the lines 9—9 of Figure 8.
Figure 10:
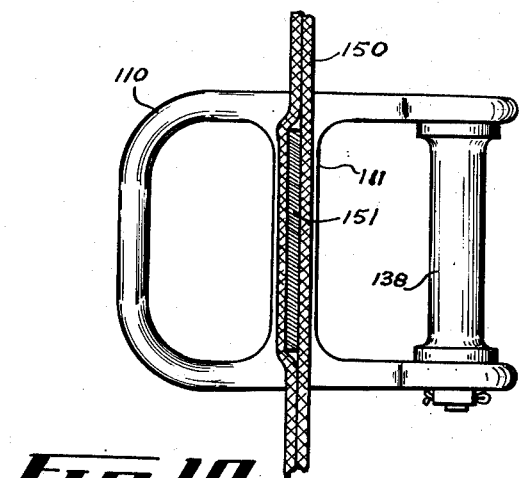
Figure 10 shows the application of two of the links to a folded parachute pack.
Figure 11:
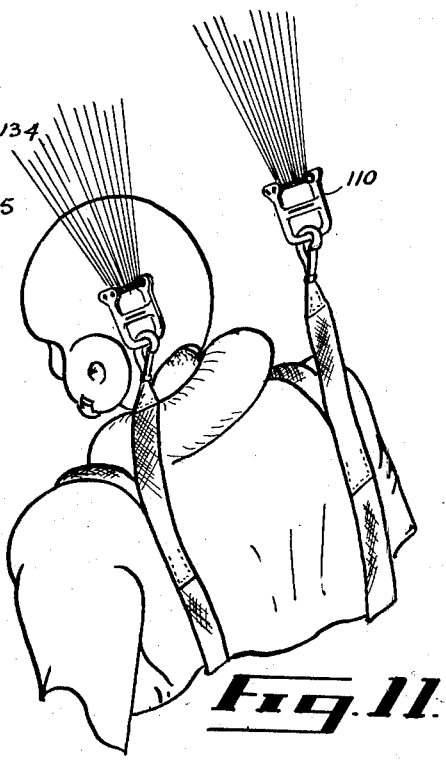
Figure 11 shows the application of two of the links in connecting the shroud lines to the webbing.

The use of the device whose parts are lastly described, is as follows: Two connector links of this type are used in connecting the harness webbing to the shroud lines. Each of these is adapted to be clipped to one of the safety clips of the harness webbing, in the usual manner of chest packs, and is fastened to the canopy packing container 150 by a metal leaf 151 running through slot 116 of cross bar 111. (See Figure 8.) To each of the two spools of each of the links is attached one quarter of the shroud lines from the canopy, so that to each of the two links is connected, one half of the shroud lines from the canopy. It is therefore proposed to discuss the connector link in which this alternate embodiment of the invention lies, it being understood that two of these links will be used and that each will replace one of the links now in use. The canopy is packed in a standard chest pack but the shroud lines are knotted over four spools 138 (one quarter of them over each) lying around shanks 139 and retained thereon by the rims 140 and 141 of each spool respectively. Two of the four spools 138 are attached to a body 110 by placing each respectively between a boss 114 and its corresponding boss 118 and threading a bolt 122 through an eye 115 of the above boss 114, and bore 142 of the spool 138 and screwing it into a threaded eye 119 of the above boss 118 until the head 123 is seated in the countersunk eye 115. The threading 126 now projects sufficiently beyond the eye 119 to allow a nut 132 to be screwed thereon. The nut is screwed onto the threading until it jambs against the outer wall of the boss 118, exerting a lock-nut effect. At the same time a cotter pin 134 is threaded through the holes 133 and through the notching in the end 126 preventing rotation of the nut in case the lock-nut effect fails. The shroud lines are now firmly attached to the body. Each base 111 is adapted to be clipped into one of the safety clips 152 of the chest-pack webbing. When the above recited process is repeated twice the webbing is firmly attached to the canopy. In order to replace a canopy it is merely necessary to remove each of the four spools which have the shroud lines of the damaged canopy by removing the cotter pin 134, unscrewing the nut 132 and unscrewing and withdrawing the bolt 122, and then attaching the spools which are attached to the shroud lines of the new canopy as described above.

Having described a main embodiment and an alternate embodiment of my invention it is now proposed to show how my invention allows the easy interchanging of canopies from a seat or back-type to a chest-type of webbing (seat-type parachute and webbing being disclosed in the main embodiment). If as preferred, the eyes 15 and 115, eyes 19 and 119, bolts 22 and 122, heads 23 and 123, shanks 24 and 124, ends 25 and 125, threading 26 and 126, and the length between an eye 15 and an eye 19 and the length between an eye 115 and a corresponding eye 119 are all identical, then this interchanging is possible since if a canopy is attached to a seat or back-type pack, then it is possible to attach it to a chest-type pack by removing the four spools 38 from the four bodies 10 which are attached to the seat-type webbing, and attach them to two bodies 110 which can be clipped to a chest-type webbing, two of said spools being attached to each of the bodies 110. Conversely a canopy attached to a chest-type pack may be attached to a seat-type pack by detaching the four spools 138 from two bodies 110 and attaching them to four bodies 10 which are attachable to the seat-type webbing. It is obvious from the description given heretofore of the method of attaching spools 38 and 138 to bodies 10 and 110 respectively that this interchanging may be done at an advanced base, with rapidity by personnel having no great knowledge of parachutes and their handling. It has heretofore been necessary to return canopies to the factory in order to accomplish this and this invention is expected to add greatly to the speed and efficiency of parachute maintenance.

The bolts, nuts, and body are preferably of high strength steel, and are of sufficient size to withstand the impact force of the chute opening. The spool and sleeve are preferably made of aluminum for lightness.

It will be seen from the above description that my connector link allows the rapid interchanging of canopies and webbing, with no tools necessary, other than a screw driver while at the same time supplying a secure connection between the canopy and the webbing during the jump.

By a sleeve is meant a hollow cylindrical piece of metal.

By a body is meant a piece of metal so shaped as to have at one end pairs of aligned eyes between each pair of which one or more spools may be received and bolted in place, and at another end, means for attachment to the harness webbing.

By a spool is meant a member having a shank over which shroud lines may be looped and knotted, an axial bore in the shank to receive a bolt and retaining means at each end of the shank to retain the shroud lines on the shank.

I claim:

1. A parachute connector link having an H-shaped body, aligned eyes near the upper ends of the two uprights of the H-shaped body, a spool having an axial bore therein, a bolt, adapted to pass through one of the eyes then through the axial bore of the spool, and then through the other eye, detachable means for firmly attaching the bolt in this position, and means for attaching a strap loop from the parachute webbing to the body.

2. A parachute connector link, comprising a body, a spool over which a number of shroud lines may be looped and knotted, a sleeve which may be threaded through a webbing strap loop, said body having two pairs of aligned eyes, said sleeve and said spool both having an axial bore therein whereby said spool may be bolted between one pair of aligned eyes and said sleeve may be bolted between the other pair of aligned eyes.

3. The combination of a parachute canopy, shroud lines attached thereto, and a number of spools each having a cylindrical shank, whereby the shroud lines may be looped and knotted over the said shank, and having circular retaining rims for the shroud lines at each end of the said shank.

4. A parachute connector link having a U-shaped body, a pair of aligned eyes near the upper end of each of the two uprights of the U-shaped body, one eye of one pair being aligned with one eye of the other pair, the other eye of the first named pair being aligned with the other eye of the second named pair, a pair of spools each having an axial bore therein, a pair of bolts, each bolt being adapted to pass through one of the eyes of one of the uprights then through the axial bore of one of the spools and then through the aligned eye of the other upright, detachable means for firmly attaching each of the bolts in this position, and means for attaching the said link to the safety-clip of a chest-type parachute webbing.

PHILIP NELSON HILLESHEIM.

REFERENCES CITED

The following references are of record in the file of this patent:

UNITED STATES PATENTS

| Number | Name | Date |
|---|---|---|
| 909,782 | Gibson | Jan. 12, 1909 |
| 1,438,312 | Kerwin | Dec. 12, 1922 |
| 1,958,000 | Hamer | May 8, 1934 |
| 2,157,505 | Smith | May 9, 1939 |
| 2,393,072 | Skinner | Jan. 15, 1946 |
| 2,447,921 | Thomas | Aug. 24, 1948 |

FOREIGN PATENTS

| Number | Country | Date |
|---|---|---|
| 482,670 | Great Britain | Apr. 4, 1938 |
| 532,656 | Great Britain | Jan. 28, 1941 |
| 860,121 | France | Sept. 20, 1940 |